United States Patent [19]

Miller

[11] Patent Number: 4,523,477
[45] Date of Patent: Jun. 18, 1985

[54] PLANAR-MEASURING VORTEX-SHEDDING MASS FLOWMETER

[75] Inventor: Richard W. Miller, Foxboro, Mass.

[73] Assignee: The Foxboro Company, Foxboro, Mass.

[21] Appl. No.: 520,359

[22] Filed: Aug. 4, 1983

[51] Int. Cl.³ .......................... G01F 1/32; G01F 1/88
[52] U.S. Cl. ............................. 73/861.02; 73/861.22
[58] Field of Search ............ 73/861.02, 861.03, 861.22, 73/861.24, 861.65, 861.66

[56] References Cited

U.S. PATENT DOCUMENTS

| | | | |
|---|---|---|---|
| 4,285,246 | 8/1981 | Kitq | 73/861.03 |
| 4,404,858 | 9/1983 | Belchinger | 73/861.03 |
| 4,448,081 | 5/1984 | Kolitsch et al. | 73/861.03 |

Primary Examiner—Herbert Goldstein
Attorney, Agent, or Firm—J. H. Wu; T. Martin; W. E. Meyer

[57] ABSTRACT

A vortex-shedding mass flowmeter which includes a shedding body mounted in a pipe containing a flowing fluid, a first detecting element that responds to the vortices generated when the fluid flows past a surface of the shedding body for producing a velocity signal proportional to the flow rate of the fluid, a second detecting element for sensing in a measuring plane that includes the surface of the shedding body where vortices are generated a moving fluid characteristic dependent on the product of fluid density and the square of the fluid flow rate, and electronic circuitry coupled to the outputs of the first and second detecting elements for producing therefrom a mass flow rate signal. In one preferred embodiment, the second detecting element is a pitot-type head device which senses a pressure differential between static and dynamic pressures existing at two locations on the measuring plane. In another preferred embodiment of the present invention, the second detecting element includes a drag body flow device which responds to the force being applied thereto by the flowing fluid.

12 Claims, 5 Drawing Figures

PLANAR-MEASURING VORTEX-SHEDDING MASS FLOWMETER

BACKGROUND OF THE INVENTION

1. Field of the Invention

This invention relates generally to vortex-shedding flowmeters for measuring the amount of fluid passing through a pipe and more particularly, to an apparatus for determining the mass flow rate of the moving fluid.

2. Description of the Prior Art

For many industrial fluid processes such as custody transfer, fuel metering or reactant mixing applications, it is desirable to be able to measure the mass flow rate of the fluid passing through the pipe.

In a conventional vortex-type flowmeter, fluid passing around a shedding body produces a stream of vortices with a generation rate which is proportional to the flow rate (v) of the fluid. A sensor responsive to the vortices produces a signal having a frequency representing the flow rate. Since the cross sectional area of the flowmeter is known, the flow rate signal can then be used for calculating the resulting volumetric flow rate of the fluid in the pipe. If the density ($\rho$) of the fluid is also known, the resulting product of volumetric flow rate and density is the mass flow rate. However, it is not possible to provide a simple constant of proportionality to derive mass flow rate from only the direct measurement of volumetric flow rate because density is sensitive to changes in temperature and pressure. For gas applications, this sensitivity is typically so greatly pronounced that a direct measurement of density under operating conditions is necessary in order to obtain reasonably accurate measures of mass flow rates.

Various devices for measuring mass flow have been proposed which do not require fluid density to be measured directly. For example, in U.S. Pat. No. 3,719,073 issued to Mahon, a mass flowmeter is disclosed wherein a vortex-shedding body is used in series with a downstream sensor that detects both the frequency and amplitude of the oscillating flow pattern resulting from the interaction of the moving process fluid and the vortex-shedding body. The Mahon patent teaches that the frequency varies directly with changes of the fluid flow rate (v) and the amplitude varies with changes of a flow characteristic which is the product of the fluid density and the square of the fluid flow rate (i.e., $\rho v^2$). As a result, the mass flow rate can be calculated by dividing one sensor signal representing the detected amplitude of the flow pattern by another sensor signal representing the frequency of the flow pattern.

Another prior art mass flowmeter is disclosed in U.S. Pat. No. 3,785,204 issued to Lisi, wherein a vortex-shedding measuring device is combined in series with a differential pressure instrument having two pressure taps. One pressure tap is placed upstream and the other pressure tap is disposed downstream of the vortex-shedding measuring device. Using the measuring device as an obstruction in the moving stream of fluid, a pressure drop is created which is well known to be proportional to the $\rho v^2$ flow characteristic. As a result, the calculation of the mass flow rate is similar to that taught in the Mahon patent wherein the measured $\rho v^2$ flow characteristic is divided by the fluid flow rate v.

However, a problem inherent in the mass flowmeters described in the Mahon and Lisi patents arises from the axial separation between the device measuring the $\rho v^2$ flow characteristic and the device measuring the fluid flow rate. It is known that this separation results in some energy changes primarily in the form of pressure losses and increased turbulence appearing between the two measuring devices. These energy changes limit the accuracy of the mass flow rate measurement since the conditions existing respectively at the two measuring locations are not the same. Thus, in order to increase the measurement accuracy of these prior art flowmeters, particularly for use in low-pressure gas applications, additional devices and circuitry are needed to compensate for errors arising from the aforementioned energy changes. But the use of compensating devices, whether for liquid or gas applications, increases the complexity of both types of prior art flowmeters so that they become more costly and less reliable. Moreover, error compensation becomes more complicated as the axial separation between the two measuring locations is reduced because the correctional factors become more difficult to predict.

Accordingly, there is a need for an improved flowmeter for measuring the mass flow rate of a process fluid without resorting to the use of additional circuitry or devices to compensate for energy changes.

SUMMARY OF THE INVENTION

The above-mentioned problems of prior art devices are overcome by the provision of a new and improved flowmeter made in accordance with the teachings of the present invention wherein a conventional vortex flowmeter having a shedding body is combined with a density-sensitive measuring device mounted in a surface of the shedding body. The density-sensitive device operates to measure the $\rho v^2$ flow characteristic of the moving fluid in the same plane in which the vortices are generated. This arrangement substantially eliminates the problem previously discussed, i.e., errors arising from energy changes due to measurements being made at locations that are separated axially in the pipe.

In one preferred embodiment of the present invention, a pitot device is used for sensing the pressure differential which is proportional to the $\rho v^2$ flow characteristic of the moving fluid. At least one opening or port is formed on the upstream surface of the shedder body for sensing the dynamic pressure of the flowing fluid. Another port for sensing the static pressure of the flowing fluid is formed in the pipe where the vortex-generating plane containing the upstream surface of the shedder body intersects the inner wall of the pipe. Since this other port is in the same plane in which the dynamic pressure is sensed and from which vortices are formed, there is no requirement of using correctional factors such as expansion coefficients to compensate for energy changes.

In a second embodiment of the present invention, a target meter having its force-sensing plate mounted to be flush with the upstream surface of the shedder is used to measure the $\rho v^2$ flow characteristic. The shedder body is formed with an aperture for receiving the force-sensing plate and includes a passageway therethrough for apparatus responsive to the force acting on the plate. The force sensed by the target meter is thereafter converted into a signal by appropriate circuitry so that when the signal is combined with the flow rate signal produced by the vortex flowmeter the resulting signal is representative of the mass flow rate of the fluid passing through the pipe.

DETAILED DESCRIPTION OF THE PREFERRED EMBODIMENT

Figure 1:
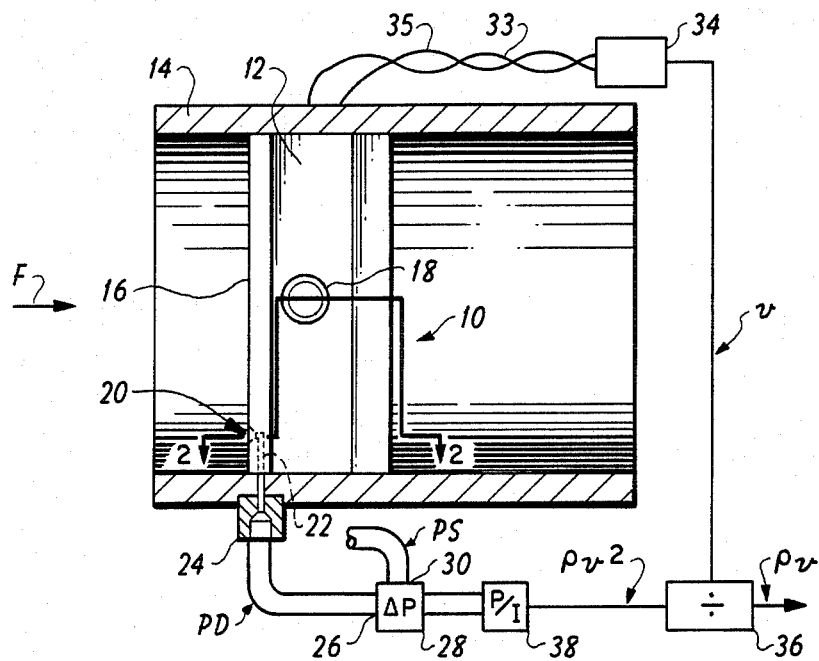
FIG. 1 is a plan view, partly broken away, showing a flowmeter constructed in accordance with the teachings of applicant's invention.

Depicted in FIG. 1 is a plan view of a mass flowmeter 10 made in accordance with the teachings of the present invention. A conventional vortex-shedding body 12 is mounted in a pipe 14 which has a fluid passing therethrough in a direction denoted by arrow F. As is well known, when the fluid passes the non-streamlined face of an upstream surface 16, the stream of fluid cannot follow the sharp contour of that surface 16 and thus separates from the body 12. A shear layer is formed in the vicinity of the body. Having a large velocity gradient therein, the shear layer is inherently unstable and thereby breaks down after some length of travel into well-defined vortices. These vortices are rotational flow zones which form alternately on each side of the surface 16 with a frequency proportional to the fluid flow rate. Differential pressure pulses occur as the vortices are formed and shed. It should be understood that the distance is constant between the centers of any pair of vortices formed on the same side of the surface 16. This distance, also known as the vortex wavelength, varies in accordance with changes in the specific dimensions of the body 12. In other words, even though the frequency (i.e., generation rate) of the vortices depends upon the fluid flow rate, the vortex wavelength remains the same as long as the same shedding body is used.

In the present embodiment of applicant's invention shown in FIG. 1, a transducer 18 is responsive to the pressure fluctuations that occur as each vortex passes the transducer for producing an electrical signal which corresponds to the fluid flow rate. Briefly described, the transducer 18 is a liquid-filled capsule having as sidewalls a pair of flexible diaphragms which are of moderately large area so as to respond to a relatively large portion of the energy in the vortices. The diaphragms transmit the alternating vortex pressure pulses to a piezoelectric sensing element which produces a correspondingly alternating voltage signal that is transmitted over a pair of wires 33, 35 to an electrical circuit 34. Electrical circuit 34 is arranged to produce a flow signal denoted as $v$ that is respresentative of the fluid flow rate through the pipe 14. The transducer 18 is described in greater detail in U.S. Pat No. 4,085,614, issued to Curran et al, and assigned to the same assignee as the present invention.

A port 20 is formed in the vortex-shedding body 12 at the upstream surface 16. A passageway 22 connects the port 20 to a connector 24 which is coupled to one side 26 of a conventional differential pressure-measuring instrument 28. The port 20, passageway 22 and connector 24 are all part of a pitot device which will be described in more detail in connection with the other figures appended to this application. Port 20 serves to receive the dynamic pressure that is applied by the fluid onto the surface 16. The dynamic pressure is transmitted as a pressure signal denoted as PD to the pressure-measuring instrument 28.

Figure 2:
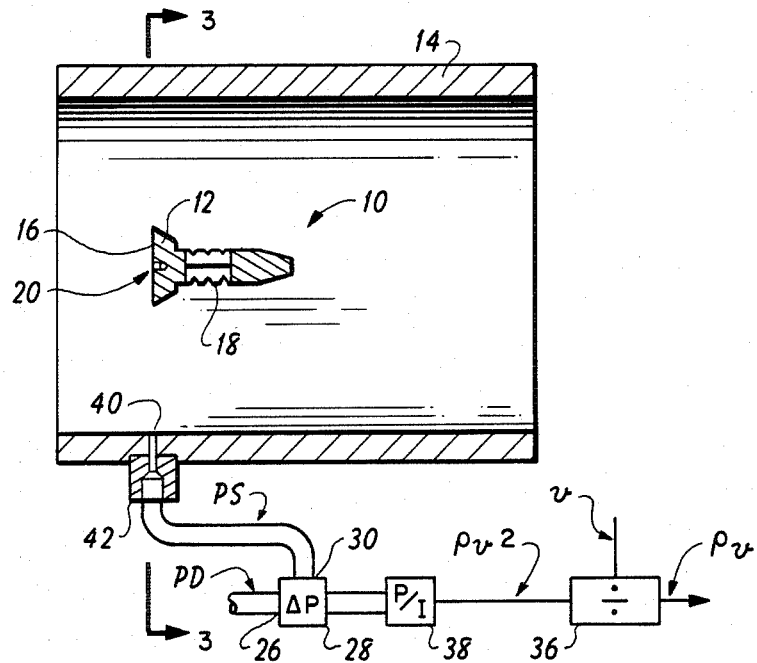
FIG. 2 is a view of the present invention taken along section line 2—2 of FIG. 1.

Depicted in FIG. 2 is a sectional top view of the mass flowmeter 10 taken along section line 2—2 shown in FIG. 1. Formed through pipe 14 at a location where a plane containing the upstream surface 16 intersects the interior wall of the pipe 14, a port 40 is connected to a connector 42 which is coupled to a side 30 of the differential pressure-measuring instrument 28. It should be noted that the port 40 is transverse to the arrow F representing the direction of fluid flow. Port 40 serves to receive the static pressure of the flowing fluid and to apply that pressure through the connector 42 as a pressure signal denoted as PS to the differential pressure-measuring device 28.

Figure 3:
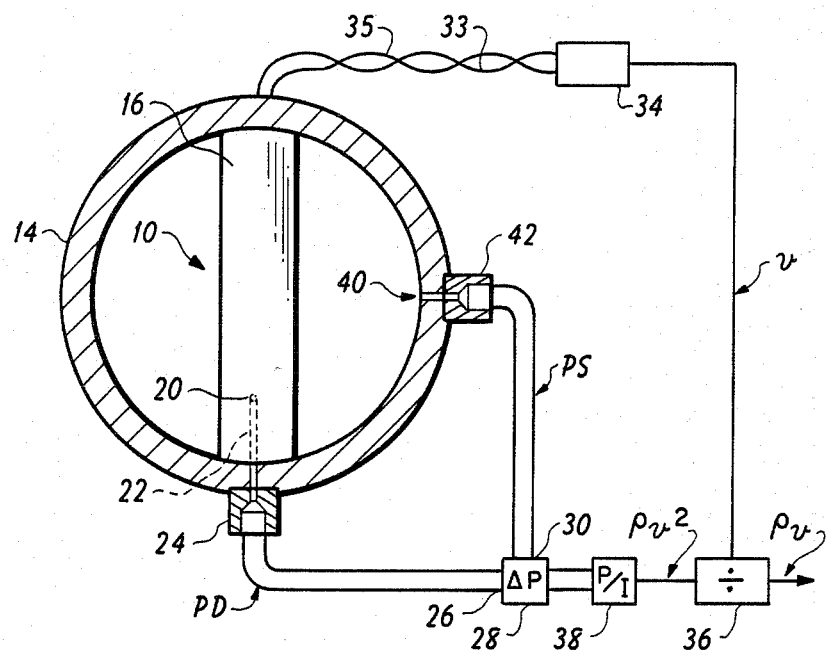
FIG. 3 depicts the present invention as viewed along section line 3—3 of FIG. 2.

Depicted in FIG. 3 is a sectional front view of the flowmeter 10 taken along line 3—3 of FIG. 2. The location of the port 20 can be anywhere along the surface 16. The port 40 can be located anywhere along the circumference of the pipe 14 and preferably in the same plane that includes the surface 16. However, the plane that is transverse to the direction of fluid flow and includes the center of the port 40 can be offset upstream or downstream from the plane of the surface 16 to a distance preferably not exceeding one-half of the vortex wavelength in order to account for manufacturing tolerances and to permit several specific sizes of the body 12 for use with the port 40. As shown in FIGS. 1 through 3, the output of the pressure-measuring instrument 28 is carried via a pipe to a pressure-to-current (P/I) converter 38 which produces an electrical signal denoted as $\rho v^2$. Coupled to receive the outputs of the electrical circuit 34 and the converter 38, a divider circuit 36 divides the electrical signal $\rho v^2$ by the flow rate signal denoted as $v$ in order to produce a signal denoted as $\rho v$ which corresponds to the mass flow rate of the process fluid flowing through pipe 14.

The ability to measure mass flow rate is desirable, especially for the situations involving custody transfer where the amount of fluid being transferred from one facility to another is used for determining the monetary payment owed to a supplier by a buyer. One advantage of the present invention over previous mass flowmeters is that its component parts are rugged and can be made to withstand extreme conditions such as fluid flows containing solids or corrosive elements. Being basically simple, the sensing elements of the present invention that are exposed to the flowing fluid are stationary and do not involve such things as rotating blades or pivotably-mounted vanes.

Figure 4:
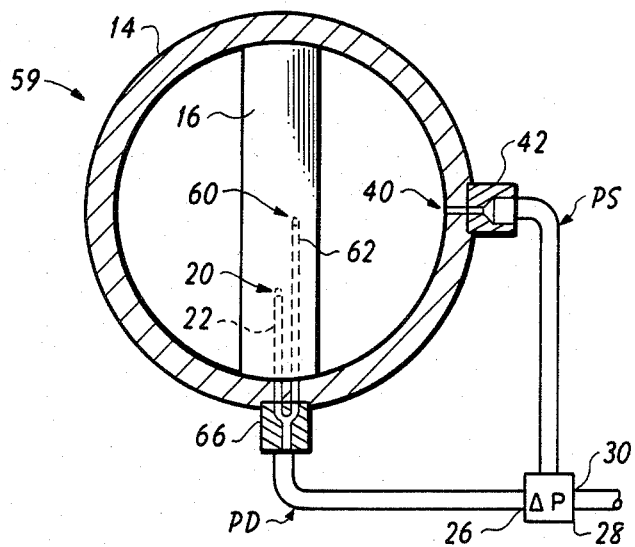
FIG. 4 shows another embodiment of the present invention wherein two ports are used for sensing dynamic pressure.

Depicted in FIG. 4 is a second embodiment 59 of applicant's invention wherein the upstream surface 16 includes a second port 60 for receiving the dynamic pressure being exerted on the surface 16 by the fluid. One end of a passage 62 is connected to the port 60 and the other end is coupled to the passageway 22 via a connector 66. This arrangement permits the dynamic pressures received by the ports 40 and 60 to be combined into a resultant dynamic pressure signal for transmission to the pressure-measuring instrument 28. It should be understood that the actual locations of the ports 20 and 60 can be anywhere on surface 16. This second embodiment of the present invention is useful for situations where the flow profile is not uniform across the measuring plane so that it is necessary for the dynamic pressures being applied to the surface 16 by the flowing fluid to be averaged between the separated ports 20 and 60.

Figure 5:
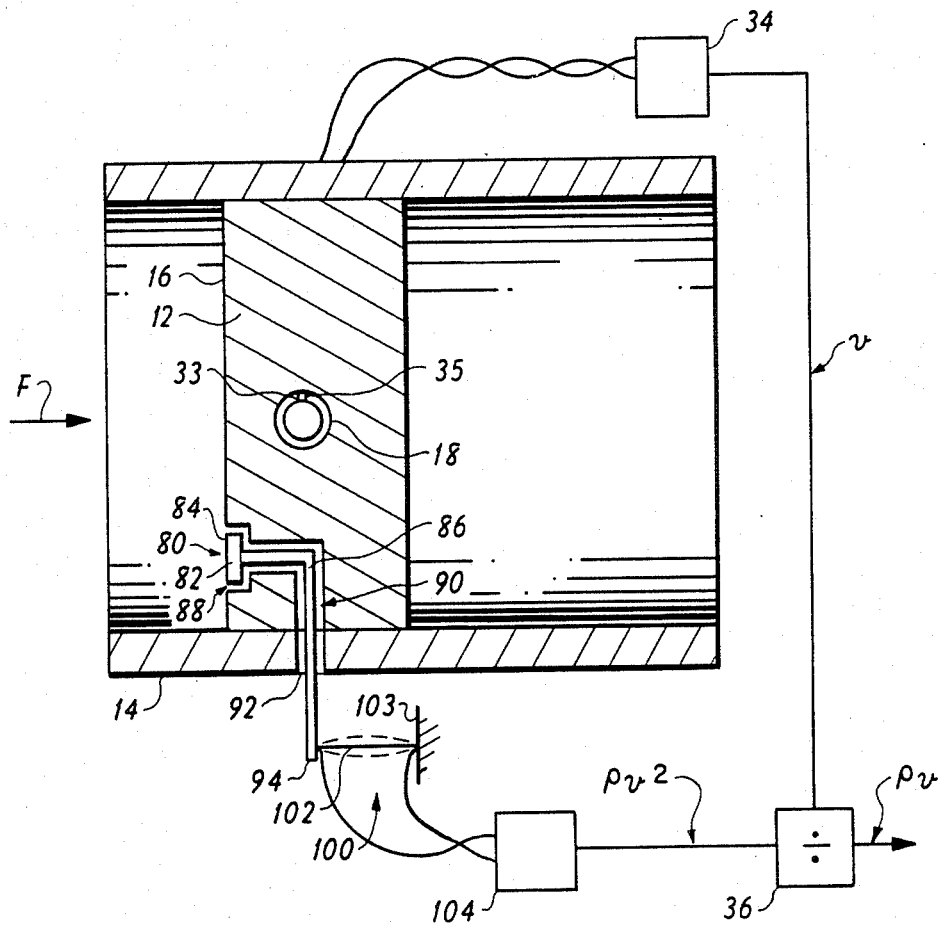
FIG. 5 depicts still another embodiment of the present invention incorporating a target meter.

FIG. 5 depicts a third embodiment of the present invention in which a drag-body device such as a target meter 80 is used to sense the $\rho v^2$ flow characteristic of the fluid. This third embodiment of the present invention includes the vortex-shedding body 12, transducer 18 and associated electrical circuit 34 which generates the electrical signal $v$ corresponding to fluid velocity. Being a part of the target meter 80, a target 82 has a flat surface 84 disposed to be flush with the upstream surface 16. A connecting rod 86 has one end coupled to the target 82 and the other end extending through the wall of pipe 14. An aperture 88 is formed in the shedding body 12 for receiving the target 82 and a cavity 90 is formed in the shedder body 12 for containing the connecting rod 86. A flexure 92 pivotably mounts the rod 86 to the pipe 14 and also seals the cavity 90 in order to prevent the flowing fluid from escaping. The free end 94 of the connecting rod 86 is thereby movable in response to the force being applied to the target 82 by the flowing fluid.

A vibrating wire assembly 100 is used to sense the movement of the end 94 of the connecting rod 86. The vibrating wire assembly is well known in the art as a force transducer, so only a brief description will be hereinafter presented. A vibratable wire 102 has one end mounted to a stationary mounting 103 and the other end coupled to the connecting rod 86 near the end 94. When the wire 102 is excited into vibratory motion (by apparatus not described), the frequency of vibration is dependent upon the tension being exerted thereon as a result of the force being applied by the flowing fluid onto the target 82. A detecting circuit 104 is responsive to the vibratory frequency of the wire 102 and produces the electrical signal denoted as $\sigma v^2$. The divider circuit 36 in response to the outputs from the converter 34 and the detecting circuit 104 produces the resulting signal denoted as $\rho v$ corresponding to the mass flow rate.

While the present invention has been described with reference to several embodiments, it will be apparent that improvements and modifications may be made without departing from the true spirit and scope of the invention as defined in the appended claims. Specifically, the electrical signals produced by the electrical circuit 34, the divider circuit 36 and the converter 38 can be analog, digital or frequency signals. Moreover, the third embodiment of the present invention is particularly suited for the frequency domain since the conventional vortex flowmeter and the vibrating wire assembly 100 are frequency devices. In addition, the third embodiment can have other force detecting means that are different from the vibrating wire type.

What is claimed is:

1. A vortex-shedding flowmetering apparatus comprising:
   a conduit adapted for passing therethrough a flowing fluid;
   a vortex-shedding element being fixedly mounted in said conduit and having a surface for producing vortices;
   a measuring plane that includes said surface and is disposed transversely to the direction of motion of said flowing fluid;
   vortex-responsive means for generating a velocity signal that is representative of the shedding rate of said vortices and is thereby proportional to the volumetric flow rate of said fluid in said measuring plane;
   sensor means for detecting in said measuring plane a moving fluid characteristic that is dependent upon the product of fluid density and the square of said volumetric flow rate; said sensor means comprising a pitot device which includes at least a first intake located on said surface for sensing fluid dynamic pressure, a second intake for sensing fluid static pressure, said second intake being disposed substantially at the intersection of said measuring plane with the inner wall of the conduit, and means coupled to said first and second intakes and arranged to be responsive to said dynamic and static pressures for producing a sensor signal corresponding to said moving fluid characteristic; and
   means for receiving both said sensor and velocity signals and combining these signals in accordance with a prescribed relationship so as to produce a flow signal proportional to the rate of mass flow of the fluid passing through the conduit.

2. The apparatus of claim 1 wherein said pitot device includes a third intake for measuring said fluid dynamic pressure; said third intake being disposed on said surface.

3. The apparatus of claim 1 wherein said surface is a flat upstream face of the vortex-shedding element.

4. The apparatus of claim 1 wherein said pressure-responsive means is a differential pressure-measuring device coupled to said pitot device for receiving said dynamic and static pressures.

5. The apparatus of claim 4 wherein said pressure-responsive means further includes a pressure-to-current converter coupled to the output of said differential pressure-measuring device for producing an electrical signal as the sensor signal corresponding to said moving fluid characteristic.

6. The apparatus of claim 5 wherein said circuit means is arranged to divide a characteristic of said electrical signal by a characteristic of said velocity signal in order to produce said mass flow rate signal.

7. The apparatus of claim 6 wherein said characteristic of each of said electrical and velocity signals is frequency.

8. In a vortex-shedding mass-flowmetering instrument of the type for use in a conduit adapted for passing therethrough a flowing fluid, a vortex-shedding element being mounted in said conduit and having a surface for producing vortices which result from the interaction of said flowing fluid with said shedding element, means responsive to said vortices for generating a velocity signal that is representative of the shedding rate of said vortices and is thereby proportional to the volumetric flow rate of said fluid in the conduit, and apparatus comprising:
   sensor means for detecting in a measuring plane, which includes said vortex-producing surface, a moving fluid characteristic dependent upon the product of fluid density and the square of said volumetric flow rate, said sensor means being operative for producing a sensor signal corresponding to said moving fluid characteristic;

said sensor means comprising a target meter which includes a movable plate pivotably mounted to a stationary support and disposed in said measuring plane for detecting said moving fluid characteristic;

said vortex-shedding element being formed with a cavity therein for receiving said target meter and movable plate; and means for receiving both said sensor and velocity signals and for combining these signals in accordance with a prescribed relationship so as to produce a flow signal proportional to the rate of mass flow of the fluid passing through the conduit.

9. The apparatus of claim 8 wherein said surface is a flat upstream face of said vortex-shedding element.

10. The apparatus of claim 8 wherein said sensor means further includes a vibrating-wire device for measuring the force being applied to said movable plate and thereby generating a force-representative signal as the sensor signal responsive to said moving fluid characteristic.

11. The apparatus of claim 10 wherein said circuit means operates to divide a characteristic of said force signal, received from said vibrating-wire device, by a characteristic of said velocity signal in order to produce said mass flow rate signal.

12. The apparatus of claim 11 wherein said characteristic of each of said force and velocity signals is frequency.

* * * * *